(12) United States Patent
Durandeau et al.

(10) Patent No.: US 8,580,355 B2
(45) Date of Patent: Nov. 12, 2013

(54) METHOD FOR THIN LAYER DEPOSITION

(75) Inventors: Anne Durandeau, Paris (FR); Andriy Kharchenko, Palaiseau (FR); Nicolas Nadaud, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 249 days.

(21) Appl. No.: 12/937,119

(22) PCT Filed: Apr. 10, 2009

(86) PCT No.: PCT/FR2009/050658
§ 371 (c)(1),
(2), (4) Date: Feb. 1, 2011

(87) PCT Pub. No.: WO2009/136110
PCT Pub. Date: Nov. 12, 2009

(65) Prior Publication Data
US 2011/0117293 A1    May 19, 2011

(30) Foreign Application Priority Data
Apr. 11, 2008 (FR) .................................. 08 52454

(51) Int. Cl.
*B05D 3/00*    (2006.01)
*B05D 3/06*    (2006.01)

(52) U.S. Cl.
USPC .......................................... 427/554; 427/557

(58) Field of Classification Search
USPC .................... 427/557, 559, 372.2
See application file for complete search history.

(56) References Cited

U.S. PATENT DOCUMENTS

| | | |
|---|---|---|
| 4,216,259 A | 8/1980 | Groth |
| 2003/0003304 A1 | 1/2003 | Ohtsu et al. |
| 2003/0170464 A1* | 9/2003 | Veerasamy ................ 428/426 |
| 2007/0130995 A1* | 6/2007 | Hawtof et al. ................ 65/377 |
| 2008/0008829 A1* | 1/2008 | Blacker et al. ................ 427/162 |

FOREIGN PATENT DOCUMENTS

| | | |
|---|---|---|
| EP | 1 867 614 | 12/2007 |
| WO | 03 051787 | 6/2003 |

OTHER PUBLICATIONS

International Search Report issued Dec. 29, 2009 in PCT/FR09/050658 filed Apr. 10, 2009.
U.S. Appl. No. 13/496,090, filed Mar. 14, 2012, Kharchenko, et al.

* cited by examiner

*Primary Examiner* — Dah-Wei Yuan
*Assistant Examiner* — Nga Leung V Law
(74) *Attorney, Agent, or Firm* — Oblon, Spivak, McClelland, Maier & Neustadt, L.L.P.

(57) ABSTRACT

The subject of the invention is a process for obtaining a material comprising a substrate and at least one at least partially crystalline titanium-oxide-based thin film deposited on a first side of said substrate, said process comprising the following steps:
- said at least one titanium-oxide-based thin film is deposited;
- said at least one titanium-oxide-based thin film is subjected to a crystallization treatment, supplying energy capable of raising each point of said at least one titanium-oxide-based thin film to a temperature of at least 300° C. while maintaining a temperature not exceeding 150° C. at any point on the opposite side of said substrate to said first side;
- said crystallization treatment being preceded by a deposition step, in which an energy-providing film is deposited above and/or below said titanium-oxide-based thin film, said energy-providing film being capable of absorbing the energy supplied during said crystallization treatment more effectively than said at least one titanium oxide film and/or of creating additional energy during said crystallization treatment, and of transmitting at least some of said energy to said at least one titanium-oxide-based thin film during said crystallization treatment.

21 Claims, No Drawings

METHOD FOR THIN LAYER DEPOSITION

The invention relates to the field of thin inorganic films, especially those deposited on glass substrates. It relates more particularly to a process for at least partially crystallizing said thin films and to certain products obtained using this process.

Many thin films are deposited on substrates, especially those made of flat or slightly curved glass, so as to give the materials obtained particular properties, namely: optical properties, for example reflection or absorption properties for radiation with a given wavelength range; particular electrical conduction properties; or else properties associated with ease of cleaning or with the possibility of the material being self-cleaning.

These thin films are usually based on inorganic compounds, such as oxides or nitrides, or else on metals. Their thickness generally varies from a few nanometers to a few hundred nanometers, hence they are termed "thin".

In particular, thin films based on titanium oxide may be mentioned that have the particular feature of being self-cleaning, making it easier for organic compounds to be degraded under the action of ultraviolet radiation and for mineral contamination (dust) to be removed through the action of running water.

These films have the particular feature of seeing some of their properties improved when they are in an at least partially crystallized state. In general, the aim is to maximize the degree of crystallization (the proportion by weight or by volume of crystallized material) of these layers and the size of the crystalline grains (or the size of the coherent diffraction domains measured by X-ray diffraction methods), or in certain cases to promote a particular crystallographic form.

In the case of titanium oxide, it is known that titanium oxide crystallized in the anatase form is much more effective in terms of organic compound degradation than amorphous titanium oxide or titanium oxide crystallized in the rutile or brookite form.

One process commonly employed on an industrial scale for the deposition of thin films, especially on a glass substrate, is the magnetically enhanced sputtering process, called magnetron sputtering. In this process, a plasma is created in a high vacuum close to a target comprising the chemical elements to be deposited. The active species of the plasma, which bombard the target, tear off said elements, which are deposited on the substrate, thus forming the desired thin film. This process is said to be "reactive" when the film consists of a material resulting from a chemical reaction between the elements torn off the target and the gas contained in the plasma. Thus, it is known to deposit titanium oxide films by the reactive magnetron sputtering process employing a metallic titanium target or a ceramic target made of $TiO_x$ (where x<2) and an oxygen-based plasma gas. The major advantage of this process lies in the possibility of depositing a very complex multilayer coating on the same line, by making the substrate run in succession beneath various targets, this generally being carried out in one and the same device.

When implementing the magnetron sputtering process on an industrial scale, the substrate remains at ambient temperature or is raised to a moderate temperature (below 80° C.), particularly when the run speed of the substrate is high (which is generally desirable for economic reasons). What may seem to be an advantage constitutes however a drawback in the case of the aforementioned films, since the low temperatures involved do not in general allow sufficient crystalline growth. This is most particularly the case for thin films of small thickness and/or films made of materials having a very high melting point. The films obtained according to this process are therefore predominantly, or even completely, amorphous or nanocrystallized (the average size of the crystalline grains being less than a few nanometers), and heat treatments prove to be necessary in order to obtain the desired degree of crystallization or the desired grain size.

Possible heat treatments consist in reheating the substrate either during deposition or after deposition, upon leaving the magnetron line. Most generally, temperatures of at least 200° C. or 300° C. are necessary.

In industrial magnetron lines, heating of the substrate (during deposition) proves however to be difficult to implement, in particular since heat transfer in a vacuum, which is necessarily radiative by nature, is difficult to control and is very costly in the case of large substrates measuring several meters in width. In the case of glass substrates of small thickness, there is often a very high risk of breakage in this type of treatment.

Heating the coated substrate after deposition, for example by placing the substrate in a furnace or an oven or subjecting the substrate to infrared radiation coming from conventional heaters, such as infrared lamps, also has drawbacks as these various processes contribute to heating the substrate and the thin film without distinction. Heating the substrate to temperatures above 150° C. is liable to cause breakages in the case of large substrates (those several meters in width) as it is impossible to ensure the same temperature over the entire width of the substrate. Heating the substrates also slows down the entire process, as it is necessary to wait while the substrates completely cool down before it can be envisaged cutting them or storing them, which generally takes place by stacking the substrates one on top of another. Very controlled cooling is also essential in order to prevent the generation of stresses within the glass, and therefore the possibility of breakages. Since such very controlled cooling is very expensive, the annealing treatment is generally not sufficiently controlled to remove the thermal stresses within the glass, thereby increasing the number of in-line breakages. The annealing treatment also has the drawback of making it more difficult to cut the glass, cracks having a lower tendency to propagate linearly.

Substrate heating does take place if the glazing is bent and/or tempered, since the glass is reheated to above its softening temperature (generally above 600° C., or even 700° C. for a few minutes). The tempering or bending treatment therefore allows the desired result, of crystallizing the thin films, to be obtained. However, it would be expensive for all glazings to be subjected to such treatments for the sole purpose of improving the crystallization of the films. Furthermore, the tempered glazing can no longer be cut, and certain thin-film multilayer coatings cannot withstand the high temperatures suffered during the tempering of the glass.

To solve these problems, the applicant has developed a process for the treatment of at least one thin titanium-oxide-based continuous film deposited on a first side of a substrate, characterized in that each point on said at least one thin film is raised to a temperature of at least 300° C. while maintaining a temperature not exceeding 150° C. at any point on the opposite side of said substrate to said first side, so as to increase the degree of crystallization of said thin film while keeping it continuous and without a step of melting said thin film.

Among possible processes are, in particular, heating by means of infrared radiation, a plasma torch or a flame.

The inventors have now demonstrated that it was still possible to improve the crystallization properties of the titanium-oxide-based films by perfecting this process.

For this purpose, the subject of the invention is a process for obtaining a material comprising a substrate and at least one at least partially crystalline titanium-oxide-based thin film deposited on a first side of said substrate, said process comprising the following steps:

said at least one titanium-oxide-based thin film is deposited;

said at least one titanium-oxide-based thin film is subjected to a crystallization treatment, supplying energy capable of raising each point of said at least one titanium-oxide-based thin film to a temperature of at least 300° C. while maintaining a temperature not exceeding 150° C. at any point on the opposite side of said substrate to said first side. In the process according to the invention, the crystallization treatment is preceded by a deposition step, in which an energy-providing film is deposited above and/or below said titanium-oxide-based thin film, said energy-providing film being capable of absorbing the energy supplied during said crystallization treatment more effectively than said at least one titanium oxide film and/or of creating additional energy during said crystallization treatment, and of transmitting at least some of said energy to said at least one titanium-oxide-based thin film during said crystallization treatment.

The improvement made to the process previously developed by the Applicant therefore consists of the presence of an overlayer and/or an underlayer (preferably an overlayer) which promotes crystallization of the titanium oxide thanks to energy absorption or creation and transfer of the absorbed or created energy to the titanium oxide film. The final energy supplied to the titanium oxide film is therefore greater than that supplied by just the crystallization treatment. The process according to the invention thus makes it possible, for the same energy supplied during the crystallization treatment, to improve the crystallization properties or, alternatively, to obtain equivalent crystallization properties for a crystallization treatment that consumes less energy.

The term "point on the film" is understood to mean an area of the film undergoing the treatment at a given instant. According to the invention, the entire film (and therefore each point) is raised to a temperature of at least 300° C., but each point on the film is not necessarily treated simultaneously. The film may be treated at the same instant in its entirety, each point on the film being simultaneously raised to a temperature of at least 300° C. Alternatively, the film may be treated so that the various points on the film or sets of points are raised in succession to a temperature of at least 300° C., this second method being more often employed in the case of continuous implementation on an industrial scale.

The expression "deposited on a first side of said substrate" is not necessarily understood to mean that the film is deposited directly on the substrate. It may be so, but one or more underlayers may be interposed between the substrate and the titanium-oxide-based film, as will be explained later in the text.

The energy-providing film is preferably deposited on top of the titanium-oxide-based thin film. In this case, it is an overlayer.

The process according to the invention provides considerable energy which promotes the crystallization of the thin film, by a mechanism of crystalline growth around nuclei already present in the film, remaining in the solid phase.

The process according to the invention has the advantage of heating only the thin film (or the thin films in the case of a multilayer coating) without significantly heating the entire substrate. Thus, it is no longer necessary to subject the substrate to controlled slow cooling before the glass is cut or stored. This process also makes it possible to integrate a heating device on existing continuous production lines, more particularly in the space located between the exit of the vacuum deposition chamber of the magnetron line and the device for storing the glass in stacks. It is also possible in certain cases to carry out the treatment according to the invention within the actual vacuum deposition chamber.

In industrial implementation incorporating a magnetron line, the process is generally continuous in the sense that the substrate is running through it, and therefore undergoes a linear movement in a direction X. Each point on the thin film is therefore preferably treated according to one of the following methods: either the heating means are fixed and a set of points forming a line along a direction Y perpendicular to the direction X may be treated simultaneously, or the heating means can move along the direction Y and each point is treated in succession. The process according to the invention may be implemented on a substrate placed either horizontally or vertically. It may also be implemented on a substrate provided with thin films on both its sides, at least one film on one of the sides or on each side being treated according to the invention. In the case where thin films deposited on both sides of the substrate are treated according to the invention, it is possible to treat said thin films on each side either simultaneously, or in succession, by identical or different techniques, in particular depending on whether the nature of the treated films is the same or different. The case in which the treatment according to the invention is carried out simultaneously on both sides of the substrate is therefore well within the scope of the invention.

It is not physically possible to heat the film without heating the substrate, since raising the temperature within the film necessarily leads, by thermal conduction mechanisms, to heating of the substrate zone closest to the film and therefore to a high thermal gradient in the thickness of the substrate. Such high thermal gradients, sometimes called thermal shocks, are known to systematically cause breakages in the case of the soda-lime-silica glasses commonly employed in the flat glass industry. These breakages, which stem from the difference in thermal expansion between the various regions of the glass subjected to different temperatures, occur more easily in the case of soda-lime-silica glasses as their expansion coefficient is quite high. They also occur more easily in the case of large substrates (measuring at least 1 m, or even 2 or even 3 m in width) as it is more difficult to ensure high temperature uniformity in the case of large substrates.

The inventors have however shown that a heat treatment involving only moderate controlled heating of a limited region of the substrate gets round this breakage problem, hitherto deemed to be inevitable. It is therefore essential when implementing the present invention for the temperature of the opposite side of the substrate to the side bearing the treated thin film not to be above 150° C. This feature is obtained by choosing a method of heating especially adapted to heating the thin film and not the substrate, and by controlling the heating time or the heating intensity and/or other parameters depending on the heating method employed, as will be described in greater detail in the rest of the text.

One feature common to all the heating methods that can be used according to the invention lies in the fact that they make it possible to generate an extremely high power per unit area, something which cannot however be quantified absolutely, as it depends on many factors among which are the nature and the thickness of the thin film. This high power per unit area makes it possible to achieve the desired temperature in the film extremely rapidly (generally in a time not exceeding 1 second) and consequently to limit the duration of the treatment correspondingly, the heat generated not therefore having the time to diffuse into the substrate. Each point on the thin film is subjected to the treatment according to the invention (i.e. raised to a temperature of 300° C. or higher) for a time generally not exceeding 1 second, or even 0.5 seconds. By contrast, since the infrared lamps conventionally used do not allow these high levels of power per unit area to be achieved, the treatment time must be longer (often several seconds) in order to reach the desired temperatures, and the substrate is then necessarily raised to high temperatures by heat diffusion.

To minimize the number of breakages in the case of the largest substrates (for example measuring 6 m in length by 3 m in width), a temperature not exceeding 100° C., especially 50° C., is preferably maintained over the entire treatment at any point on the opposite side of the substrate to the side on which the thin film is deposited.

Another advantage of the invention lies in the fact that the process subjects the thin film or thin-film multilayer coating to the equivalent of a tempering operation. It turns out that certain thin-film multilayer coatings have their optical properties (colorimetric coordinates, light transmission or energy transmission) modified when the glass is tempered. The process according to the invention therefore makes it possible to obtain an untempered glass (therefore one not having within it a stress profile specific to the tempered glass, which would make it cutable) but having substantially the same optical properties as if it had been tempered.

The degree of crystallization obtained using the process according to the invention is preferably at least 10%, or 20% or 50%, especially 70% and even 90%. This degree of crystallization, defined as the mass of crystallized material to the total mass of material, may be determined by X-ray diffraction using the Rietveld method. Owing to a crystallization mechanism by crystalline grain growth from nuclei or seeds, the increase in the degree of crystallization is generally accompanied by an increase in the size of the crystallized grains or of the coherent diffraction domains measured by X-ray diffraction.

The substrate is preferably transparent, made of glass, especially soda-lime-silica glass. The substrate may also be colorless or tinted, for example blue, green, bronze or gray. It may also be made of plastic, such as polycarbonate or polymethyl methacrylate. Advantageously, it has at least one dimension of 1 m or higher, or 2 m and even 3 m. The thickness of the substrate generally varies between 0.5 mm and 19 mm, the process according to the invention being particularly advantageous in the case of thinner substrates having a thickness not exceeding 4 mm, or even 2 mm.

That side of the substrate opposite the side on which the titanium-oxide-based film is deposited may be bare, or may be covered with one or more thin films. It may in particular be a titanium-oxide-based film or films having thermal functions (solar-control or low-E films or multilayers, especially of the type that includes at least one silver film) or optical functions (for example antireflection films or multilayers).

The film based on titanium oxide is preferably a film made of titanium oxide (optionally doped with a metal ion, for example a transition metal ion, or with nitrogen, carbon, fluorine atoms, etc.).

The entire surface of this film is preferably in contact with the outside so that the titanium oxide can fully fulfill its self-cleaning function. However, it may be advantageous to coat the titanium-oxide-based film with a thin hydrophilic film, especially one based on silica. One of the advantages of the process according to the invention is that this thin film may result from the energy-providing film after the crystallization treatment, as will be explained later in the text.

To further improve the crystallization of these films, it is possible to provide directly beneath the titanium-oxide-based film an underlayer having the effect of promoting the crystalline growth of the titanium oxide, especially in anatase form. This may especially be a $ZrO_2$ underlayer, as described in application WO 02/40417, or else an underlayer promoting the heteroepitaxial growth of the titanium oxide in anatase form, as described for example in application WO 2005/040058, especially a $BaTiO_3$ or $SrTiO_3$ film.

Other underlayers may be inserted between the substrate and the titanium-oxide-based film. These may for example be films acting as barriers to the migration of alkali metals, especially films based on $SiO_2$, SiOC, alumina $Al_2O_3$ or silicon nitride $Si_3N_4$. They may also be films or multilayers having thermal functions (solar-control or low-E films or multilayers, especially of the type that includes at least one silver film) or optical functions (for example antireflection films or multilayers).

The thin titanium-oxide-based film or the energy-providing film may be obtained by any type of process, in particular processes that generate predominantly amorphous or nanocrystallized films, such as the magnetron sputtering process, the plasma-enhanced chemical vapor deposition (PECVD) process, the vacuum evaporation process or the sol-gel process. However, it is preferably a "dry" film, containing no aqueous or organic solvent, as opposed to a "wet" film obtained for example by the sol-gel process.

The thin titanium-oxide-based film and the energy-providing film are preferably deposited by sputtering, especially magnetron sputtering.

In the case of a film obtained by the sol-gel process, precursors in solution (sol) are deposited on the substrate, the film obtained then being dried and annealed so as to remove any trace of solvent. In this case, the energy provided by the heating then serves predominantly to remove this solvent, without necessarily affecting the crystallization properties of the film, and it is consequently more difficult to improve said properties in a time short enough not to also heat the substrate.

The energy-providing film is preferably deposited in direct contact with the titanium-oxide-based film, preferably on the latter. In this way, energy transfer from the energy-providing film to the titanium-oxide-based film is optimized.

The energy-providing film preferably has an absorption in the wavelength range between 300 and 3000 nm, preferably between 600 and 1100 nm and in particular between 800 and 1100 nm. It is thus possible to use techniques employing radiation lying within this range, such as YAG lasers, laser diodes and infrared lamps combined with focusing devices. The energy-providing film absorbs this radiation and transmits some of the energy by conduction into the titanium oxide film. In the absence of an energy-providing film, the titanium oxide would be hardly affected by this type of radiation as it has no particular absorption in this wavelength range.

The energy-providing film may, alternatively or additionally, be capable of emitting energy by an exothermic reaction, especially a combustion or oxidation reaction. The energy-providing film may thus burn under the effect of the crystallization treatment, emitting nearby and transferring into the titanium oxide film substantial energy that will help to improve its crystallization.

The energy-providing film may be capable of evaporating, at least partially or even completely, during the crystallization treatment. In the case of a combustion or oxidation reaction, the film may be converted at least partly into gas.

The energy-providing film may also be capable of oxidizing, at least partially or even completely, during the crystallization treatment and of becoming at least partially transparent in the visible range.

These energy-providing films, which evaporate or oxidize, may be termed sacrificial films in the sense that, after having fulfilled their function of providing energy of benefit to the titanium oxide, they no longer as such (in their initial form) form part of the final material.

Alternatively, the energy-providing film, or its reaction product arising during the crystallization treatment, may remain on the surface of the material after treatment. In this case, it may be necessary to remove it, for example by chemical or cleaning treatments.

Various types of film may implement one or more of these advantageous properties.

The energy-providing film may for example be made of titanium metal. Titanium metal absorbs in the visible and near infrared wavelength ranges, in which ranges its oxide is transparent. Furthermore, part of the titanium metal will evaporate during the heat treatment, the other part oxidizing so as to become titanium oxide. The titanium metal film consequently disappears during the crystallization treatment, and the final product obtained no longer includes an absorbent titanium overlayer. The titanium film is preferably deposited by magnetron sputtering using a titanium target in an argon atmosphere.

The energy-providing film may also be made of carbon, especially of the graphite and/or diamond type. Carbon absorbs infrared radiation and, under the effect of the crystallization treatment, especially when it involves a flame or a plasma torch, the carbon will undergo a combustion reaction. The energy released by this exothermic reaction helps to promote crystallization of the titanium oxide. Advantageously, the graphite film is deposited by magnetron sputtering using a graphite target in an argon atmosphere. Other possible processes include ion beam deposition and plasma-enhanced chemical vapor deposition (PECVD).

The energy-providing film may also be made of silicon, optionally alloyed with aluminum. Silicon has a strong absorption in the wavelength range going from the visible to the near infrared. Under the effect of the crystallization treatment, especially when it employs a laser emitting in the infrared, the silicon will also oxidize, giving rise to a silica layer, optionally containing aluminum. This oxidation is exothermic and will therefore release energy, some of which will serve to promote crystallization of the titanium oxide. The silica layer obtained is hydrophilic and may help, if its thickness is small (less than 5 nm or even less than 2 nm), to improve the photo-induced hydrophilicity of the titanium oxide, and consequently its self-cleaning and anti-fouling properties. The silicon may be doped with aluminum, especially having contents between 5 and 10 wt %. The presence of aluminum in fact improves the chemical stability of the film. Furthermore, deposition of such films by sputtering is facilitated since the aluminum helps to increase the electronic conductivity of the silicon targets.

The energy-providing film may also be made of titanium carbide or silicon carbide. These films exhibit strong absorptions in the visible and near infrared ranges, for which ranges titanium oxide is transparent. Under the effect of the crystallization treatment, these films will oxidize, into titanium oxide (and therefore become integrated into the subjacent titanium oxide film, creating an additional thickness) or into silicon oxide, respectively, having the above-mentioned advantages.

Advantageously, the energy-providing film has a thickness of between 1 and 100 nm, especially between 1 and 20 nm.

For greater simplicity, the crystallization treatment is preferably carried out in air and/or at atmospheric pressure. Certain treatments are however compatible with a vacuum, and it may be advantageous to perform the crystallization treatment within the actual vacuum deposition chamber.

Various heating means allowing a very high power per unit area to be generated can be used for implementing the crystallization treatment. The heating parameters, such as the power of the heating means or the heating time, are adapted on a case-to-case basis by a person skilled in the art according to various parameters, such as the nature of the heating process, the thickness of the film, the size and the thickness of the substrates to be treated, etc.

The crystallization treatment may be carried out using infrared radiation. To minimize the supply of heat to the substrate, the wavelength of the radiation chosen is preferably not within that part of the infrared radiation absorbed by the substrate. For the abovementioned reasons, the radiation must be characterized by a high power per unit area. For this reason, the thin film is preferably heated using a laser emitting infrared radiation. Systems based on infrared lamps associated with a focusing device (for example a cylindrical lens) enabling high levels of power per unit area to be achieved can also be used.

It is possible to employ a laser emitting radiation having a wavelength between 5 and 15 microns, for example a $CO_2$ laser emitting radiation with a wavelength of 10.6 microns. The advantage is that titanium oxide absorbs in this wavelength range.

It is, however, preferable to employ a laser emitting radiation having a wavelength between 0.5 and 3 microns. Preferably, an energy-providing film is therefore chosen that has a strong absorption in this wavelength range, such as titanium, carbon in graphite form, silicon, optionally doped with aluminum, or else silicon carbide or titanium carbide. A neodymium-doped YAG (yttrium aluminum garnet, $Y_2Al_{15}O_2$) laser emitting, in continuous or pulsed mode, radiation of around 1 micron in wavelength proved to be particularly suitable, especially when the substrate does not absorb in this wavelength range, which is the case for clear glass in which the weight content of iron oxide is 0.1% or less. It is also possible to employ diode lasers, the emission wavelength of which is around 800 nm.

The use of excimer lasers emitting radiation in the ultraviolet range is also possible for films that absorb such radiation.

For greater simplicity of implementation, the lasers employed within the context of the invention may be fiber-guided lasers, which means that the laser radiation is injected into an optical fiber and then delivered close to the surface to be treated via a focusing head. The laser may also be a fiber laser, in the sense that the amplifying medium is itself an optical fiber.

Since lasers can irradiate only a small area (typically of the order of a fraction of a $mm^2$ to several hundred $mm^2$), it is necessary, in order to treat the entire surface, to provide a system for moving the laser beam in the plane of the substrate, or a system forming a laser beam as a line that simultaneously irradiates the entire width of the substrate, beneath which line the substrate runs.

The crystallization treatment may also be carried out by thermal spraying techniques, especially by a plasma spraying technique.

A plasma is an ionized gas generally obtained by subjecting what is called a "plasma gas" to excitation, such as a high DC or AC electric field (for example an electric arc). Under the action of this excitation, electrons are torn out of the atoms of the gas and the charges thus created migrate toward the oppositely charged electrodes. These charges then excite other atoms of the gas by collision, creating by an avalanche effect a homogeneous or microfilamentary discharge or else an arc. The plasma may be a "hot" plasma (the gas is thus entirely ionized and the plasma temperature is of the order of $10^{6\circ}$ C.) or a "thermal" plasma (the gas is almost entirely ionized and the plasma temperature is of the order of $10^{4\circ}$ C., for example in the case of electric arcs). The plasmas contain many active species, i.e. species capable of interacting with matter, including ions, electrons or free radicals. In the case of a plasma torch, a gas is injected into an electric arc and the thermal plasma formed is blown onto the substrate to be treated. The plasma torch is commonly employed to deposit thin films on various substrates by adding precursors in powder form to the plasma.

Within the context of the invention, the plasma torch is preferably combined with an automatic movement system located perpendicular to the direction in which the coated substrate runs and enabling the entire surface to be treated by the torch moving successively back and forth above the substrate.

The injected gas is preferably nitrogen, air or argon, advantageously having a hydrogen volume content of between 5 and 50%, especially between 15 and 30%.

The crystallization treatment may also be carried out by subjecting the thin film to the action of at least one flame.

This flame treatment is preferably carried out on a flame treatment rig located perpendicular to the run direction of the substrate. The length of the flame treatment device is preferably at least equal to the width of the coated substrate, thereby easily enabling the treatment to be carried out on the run, that is to say without requiring a displacement system. The gas used may be a mixture of an oxidant gas, chosen especially from air, oxygen or mixtures thereof, and a combustible gas, chosen in particular from natural gas, propane, butane, or even acetylene or hydrogen, or mixtures thereof. Oxygen is preferred as oxidant gas, in particular in combination with natural gas (methane) or propane, on the one hand because it enables higher temperatures to be achieved, consequently shortening the treatment and preventing the substrate from being heated, and, on the other hand, because it prevents the creation of nitrogen oxides $NO_x$. To achieve the desired temperatures at the thin film, the coated substrate is generally positioned within the visible flame, especially in the hottest region of the flame, a portion of the visible flame then extending around the treated region.

Flame treatment is a technique widely employed for treating the surface of polymers so as to improve their wettability properties and to make it easier for them to be coated with paints. In the use to which flame treatment is put, the principle is to subject the surface to be treated to the action of radicals created by the combustion, without raising said surface to a high temperature. Application US 2006/128563 describes the use of this technique for activating surfaces of titanium oxide films so as to improve their hydrophilicity properties. The treatments described, which are quite similar to those carried out on polymer substrates, consist in making a substrate run through or slightly below (a few centimeters below) the tip of the visible flame. This type of treatment, which aims to create hydroxyl groups on the surface of the titanium oxide, is however not suitable for raising the thin titanium oxide film to temperatures above 200° C. and for increasing the degree of crystallization of the titanium oxide, since the temperatures in the tip of the visible flame are insufficient.

The flame treatment is preferred when it is not desired to use a mechanical movement device above the substrate. Infrared radiation treatment may itself be employed within the vacuum coater of the magnetron line. It is also advantageous when it is desired not to consume large quantities of gas.

All possible combinations of the various types of energy-providing film and the various crystallization processes are possible. According to one preferred embodiment of the invention, the energy-providing film is made of titanium and the crystallization treatment is carried out by means of infrared radiation, in particular using a laser emitting radiation between 0.5 and 3 microns, for example a YAG laser or a laser diode. According to another preferred embodiment, the energy-providing film is made of graphite and the crystallization treatment is a flame treatment.

The process according to the invention is particularly advantageous, since when a substrate containing alkali metal ions (for example a glass of the soda-lime-silica type) is raised to a high temperature, said ions have a tendency to diffuse into the titanium oxide film, thereby very considerably reducing, or even eliminating, its photocatalytic properties. For this reason, it is common practice to interpose a barrier layer between the thin titanium oxide film and the substrate so as to prevent migration of alkali metals, as taught in application EP-A-0 850 204, or to increase the thickness of the titanium oxide film so that at least the outermost surface of the film is not contaminated, as taught in application EP-A-0 966 409. In the case of the process according to the invention, the substrate is practically not heated and consequently the migration of alkali metals is virtually zero. The process according to the invention therefore makes it possible to obtain substrates made of soda-lime-silica glass coated directly with a thin titanium oxide film (for example with a thickness of the order of 10 nanometers) which nevertheless has a very high photocatalytic activity.

The invention will be illustrated by the following nonlimiting embodiment examples.

A soda-lime-silica glass substrate obtained by the float process and then cut so that its size was 3 m in width by 6 m in length was coated in a known manner by the magnetron sputtering process with a silica film 20 nm in thickness and then a thin titanium oxide film 10 nm in thickness.

Comparative Example C1 does not include an energy-providing film. The examples according to the invention are, in contrast, coated with a 5 nm thick Ti overlayer. The titanium film is preferably deposited by magnetron sputtering using a titanium target in an argon atmosphere.

Inserted between the exit of the magnetron line and the storage device is a device comprising a diode laser emitting radiation of 808 nm wavelength focused onto the Ti overlayer, along a line corresponding to the width of the substrate.

All the examples with the exception of Example C2 undergo this crystallization treatment. The temperature of the glass substrate during the treatment does not exceed 50° C., measured by pyrometry on the opposite side of the substrate from the side bearing the thin-film coating.

Table 1 below indicates the photocatalytic activity of the films before treatment and after treatment. Each trial is characterized by the thickness of the titanium overlayer and by the treatment speed. The treatment speed, directly connected to the heating of the film, is expressed in meters per minute and corresponds to the lengthwise run speed of the glass.

The photocatalytic activity corresponds to a measurement of the rate of stearic acid degradation.

The photocatalytic activity measurement is carried out in the following manner:

cutting of the coated glass into specimens measuring 5×5 cm$^2$;

cleaning of the specimens for 45 minutes in UV irradiation and in a stream of oxygen;

measurement of the infrared spectrum by FTIR for wavenumbers between 4000 and 400 cm$^{-1}$, in order to constitute a reference spectrum;

deposition of stearic acid: 60 microlitres of a stearic acid solution, dissolved at 5 g/l of stearic acid in ethanol, is deposited by spin coating onto the specimen;

measurement of the infrared spectrum by FTIR, and measurement of the area of the stretch bands for CH$_2$—CH$_3$ bonds between 3000 and 2700 cm$^{-1}$;

exposure to UVA radiation: the received power per specimen, about 35 W/m$^2$ for simulating outdoor exposure, is controlled by a photoelectric cell within the 315-400 nm wavelength range;

monitoring the photodegradation of the stearic acid film after successive exposures for 30 minutes followed by 30 minutes and then 1 hour, by measuring the area of the stretch bands for CH$_2$—CH$_3$ bonds between 3000 and 2700 cm$^{-1}$; and the photocatalytic activity is defined by the slope, expressed in cm$^{-1}$.min$^{-1}$, of the straight line representing the area of the stretch bands for CH$_2$—CH$_3$ bonds between 3000 and 2700 cm$^{-1}$ for a time between 0 and 2 hours.

TABLE 1

|    | Ep (nm) | speed (m/min.) | activity (×10$^{-4}$ cm$^{-1}$ · min$^{-1}$) |
|----|---------|----------------|----------------------------------------------|
| C1 | 0       | 5              | 3                                            |
| C2 | 5       | 0              | —                                            |
| 1  | 5       | 10             | 6                                            |
| 2  | 5       | 8              | 12                                           |
| 3  | 5       | 6              | 10                                           |
| 4  | 5       | 4              | 22                                           |

Comparative Example C1 does not include an energy-providing film. The photocatalyic activity is low, but not zero, which is testimony to the fact that there is probably slight crystallization during the treatment. The crystallization is slight since the titanium oxide is transparent at the wavelength employed and therefore does not absorb energy. Comparative Example C2 was covered with a titanium metal film, but did not undergo a crystallization treatment. The presence of titanium on the surface greatly degrades the photocatalytic activity, which cannot be measured. Examples 1 to 4 according to the invention show that the use of an energy-providing film enables the photocatalytic activity to be considerably improved. This result is due to the fact that titanium absorbs the laser radiation and transmits this energy to the titanium oxide, which can therefore reorganize and crystallize. Furthermore the titanium evaporates and/or oxidizes to a large extent, since the light transmission after treatment is almost as high as that before deposition of the overlayer. Lower run speeds beneath the laser result in higher photocatalytic activities, owing to a more intense heating of the film.

The invention claimed is:

1. A process for obtaining a substrate coated with a thin film of crystallized titanium oxide comprising:

A) depositing a thin film containing titanium oxide on a side of a substrate having opposite sides, wherein said substrate comprises an energy providing film that has been applied below said thin film and/or is applied above said thin film thereby producing a substrate comprising the thin film containing titanium oxide and an energy providing film;

B) heating one side of the substrate comprising the thin film containing titanium oxide and an energy providing film to a temperature of at least 300° C. with a laser that emits radiation having a wavelength between 0.5 and 3 microns while maintaining a temperature not exceeding 150° C. at any point on the opposite side of the substrate under conditions allowing transmission of energy from the energy providing film to the thin film containing titanium oxide; and recovering a heat-treated substrate comprising a thin film of crystallized titanium oxide.

2. The process of claim 1, wherein the substrate is glass.

3. The process of claim 1, wherein the thin film containing titanium oxide is applied to the substrate and then the energy providing film is deposited on top of the titanium oxide comprising thin film.

4. The process of claim 1, wherein a temperature not exceeding 100° C. is maintained at any point on the opposite side of the substrate to the side on which the thin film is deposited.

5. The process of claim 1, wherein each point on the thin film containing titanium oxide is raised to a temperature of 300° C. or higher for a time not exceeding 1 second.

6. The process of claim 1, wherein a degree of crystallization of the thin film containing titanium oxide obtained is at least 10%.

7. The process of claim 1, wherein the initial substrate has at least one dimension of 1 m or higher.

8. The process of claim 1, wherein the thin film containing titanium oxide comprises titanium oxide doped with a metallic ion or with nitrogen, carbon or fluoride atoms.

9. The process of claim 1, wherein the titanium oxide comprising thin film containing titanium oxide and the energy-providing film are deposited by sputtering.

10. The process of claim 1, wherein the energy-providing film is deposited so as to be in direct contact with the thin film containing titanium oxide.

11. The process of claim 1, wherein the energy-providing film has an absorption in a wavelength range between 0.5 to 3 microns.

12. The process of claim 1, wherein the energy-providing film emits energy by an exothermic reaction.

13. The process of claim 1, wherein the energy-providing film is at least partly evaporated by heating.

14. The process of claim 1, wherein the energy-providing film is at least partially oxidized by heating and becomes at least partially transparent in the visible range.

15. The process of claim 1, wherein the energy-providing film comprises titanium metal.

16. The process of claim 1, wherein the energy-providing film comprises carbon.

17. The process of claim 1, wherein the energy-providing film comprises silicon, optionally alloyed with aluminum.

18. The process of claim 1, wherein the energy-providing film comprises titanium carbide or silicon carbide.

19. The process of claim 1, wherein the laser emits infrared radiation.

20. The process of claim 19, wherein at least some of the infrared radiation has a wavelength range between 900 to 1100 nm.

21. The process of claim 1 wherein the thin film containing titanium oxide at least partially crystallized in anatase form is obtained.

* * * * *